US007796112B2

(12) United States Patent
Oh et al.

(10) Patent No.: US 7,796,112 B2
(45) Date of Patent: Sep. 14, 2010

(54) LIQUID CRYSTAL DISPLAY AND DRIVING METHOD THEREOF

(75) Inventors: Jae-Ho Oh, Seoul (KR); Tae-Sung Kim, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 953 days.

(21) Appl. No.: 11/633,969

(22) Filed: Dec. 4, 2006

(65) Prior Publication Data

US 2007/0126679 A1 Jun. 7, 2007

(30) Foreign Application Priority Data

Dec. 5, 2005 (KR) ..................... 10-2005-0117582

(51) Int. Cl.
*G09G 3/36* (2006.01)
*G09G 5/00* (2006.01)
*G06F 3/038* (2006.01)

(52) U.S. Cl. .......................... 345/100; 345/98; 345/99; 345/204

(58) Field of Classification Search ............. 345/50–51, 345/55, 87–89, 98–99, 103, 100
See application file for complete search history.

(56) References Cited

U.S. PATENT DOCUMENTS

2002/0011985 A1* 1/2002 Nakano et al. ................ 345/98
2003/0169247 A1* 9/2003 Kawabe et al. .............. 345/204
2006/0262071 A1* 11/2006 Shieh et al. ................. 345/100

* cited by examiner

*Primary Examiner*—Sumati Lefkowitz
*Assistant Examiner*—Charles Hicks
(74) *Attorney, Agent, or Firm*—Innovation Counsel LLP

(57) ABSTRACT

A liquid crystal display and a driving method therefor comprises a plurality of pixels arranged in a matrix; data lines and gate lines connected to the pixels; a signal controller processing first image data and a plurality of control signals from an external device and transmitting the processed first image data and control signals; and a data driver connected to the signal controller, wherein the signal controller divides the first image data into and sequentially processes a plurality of sets respectively including the first image data for at least two pixel rows, while delaying the remaining image data excluding the last image data among the first image data of each of the sets, and the data driver applies a charge sharing voltages as impulse voltages to the predetermined number of pixel rows during the delayed time, thereby displaying impulse images. In this way, since impulse images are displayed only by delaying image data within the same time and separate black image data are not transmitted, the data transmission frequency is not increased.

22 Claims, 7 Drawing Sheets

LIQUID CRYSTAL DISPLAY AND DRIVING METHOD THEREOF

CROSS-REFERENCE TO RELATED APPLICATION

This application claims priority to and the benefit of Korean Patent Application No. 10-2005-0117582 filed in the Korean Intellectual Property Office on Dec. 5, 2005, the contents of which are incorporated herein by reference.

FIELD OF THE INVENTION

The present invention relates to a liquid crystal display and a driving method thereof.

DESCRIPTION OF THE RELATED ART

In general, a liquid crystal display (LCD) includes two panels provided with pixel electrodes, a common electrode and a liquid crystal (LC) layer having dielectric anisotropy between the two panels. The pixel electrodes are arranged in a matrix and connected to switching elements, such as thin film transistors (TFTs), which are sequentially supplied with data voltages row by row. The common electrode is formed on the entire surface of the panel and supplied with a common voltage. A pixel electrode and the common electrode, along with the LC layer therebetween, form a LC capacitor which, along with the switching element connected to the LC capacitor, become the fundamental pixel unit.

In the LCD, voltages are applied to two electrodes to generate an electric field in the LC layer, the strength of which changes the transmittance of light passing through the LC layer, thereby displaying desired images. In order to prevent the application of a unidirectional electric field to a liquid crystal layer for an undesirable length of time, the polarity of the data voltage is inverted for each frame, row, or pixel.

When a hold type LCD display device is used for displaying moving images, the edges of figures may be blurred because of the time required for the liquid crystals to re-orient themselves in response to the changing data voltages. The blurring is in proportion to the speed of the moving images. In order to reduce blurring, an impulse driving method that inserts a black image between regular images has been used.

For impulse driving, black image data as well as regular image data are transmitted to the data driver. In order to accommodate the black image, the frequency of data transmission is increased to transmit both types of image data in the same length of time. Accordingly, power consumption and electromagnetic interference (EMI) increase, and the operating speed of the data driver may reach its limit in a high resolution display. Also, since two clock frequencies exist in the signal controller processing the above, it is difficult to synchronize various signals, and internal circuits providing the impulse driving become very complicated.

SUMMARY OF THE INVENTION

Embodiments of the present invention provide a liquid crystal display comprising: a plurality of pixels arranged in a matrix; data lines and gate lines connected to the pixels; a signal controller processing first image data and a plurality of control signals and transmitting the processed first image data and control signals. A data driver is connected to the signal controller. The signal controller divides the first image data into and sequentially processes a plurality of sets including the first image data for at least two pixel rows, while delaying the remaining image data excluding the last image data among the first image data of each of the sets, and the data driver applies charge sharing voltages as impulse voltages to the predetermined number of pixel rows during the delayed time, thereby displaying impulse images.

The signal controller may comprise: a first memory receiving the first image data and a first signal among the plurality of control signals and transmitting second image data and a second signal every pixel row; a modifier receiving the second signal and transmitting a third signal; and a second memory receiving the second image data, the second signal and the third signal.

The second memory may receive the second image data in response to the second signal and simultaneously transmit a plurality of sets of third image data in response to the third signal.

The liquid crystal display may further comprise a gate driver generating first and second gate-on voltages and applying the first and the second gate-on voltages to the gate lines, and the gate driver may sequentially apply the first gate-on voltage to the gate lines and then simultaneously apply the second gate-on voltage to a plurality of gate lines excluding the gate lines during the delayed time.

Also, when the delayed time is referred to as a first blank interval, the third image data set may further comprise a second blank interval located between the first blank interval and the third image data, and the first blank interval may be longer than the second blank interval.

Each set including the second image data may comprise a third blank interval located between the second image data, and the interval of each set including the second image data may be equal to the interval of each set including the third image data.

Meanwhile, the charge sharing voltages may be obtained by connecting the data lines to each other.

The liquid crystal display may further comprise a common voltage generator applying a common voltage to a liquid crystal panel assembly in which the pixels, the gate lines and the data lines are provided, and the magnitude of charge sharing voltages may be substantially the same as that of the common voltage.

Another exemplary embodiment of the present invention provides a method of driving a liquid crystal display comprising a plurality of pixels arranged in a matrix; data lines and gate lines connected to the pixels; a signal controller receiving and processing first image data and a plurality of control signals from an exterior and transmitting the processed first image data and control signals; and a data driver connected to the signal controller, the method comprising: a first step of dividing the first image data into and sequentially processing a plurality of sets respectively including the first image data for at least two pixel rows, while delaying the rest image data excluding the last image data among the first image data of each of the sets; and a second step of applying a charge sharing voltages as impulse voltages to the predetermined number of pixel rows during the delayed time, thereby displaying impulse images.

Here, the first step may comprise: receiving the first image data and a first signal among the plurality of control signals and generating second image data and a second signal every pixel row; receiving the second signal and generating a third signal; and receiving the second image data, the second signal and the third signal, and furthermore, the first step may further comprise generating a plurality of sets of third image data in response to the third signal.

Also, the method of driving a liquid crystal display may further comprise a third step of generating first and second gate-on voltages and applying the first and the second gate-on voltages to the gate lines.

The third step may comprise sequentially applying the first gate-on voltage to the gate lines and then simultaneously applying the second gate-on voltage to a plurality of gate lines excluding the gate lines during the delayed time.

When the delayed time is referred to as a first blank interval, the third image data set may further comprise a second blank interval located between the first blank interval and the third image data, and the first blank interval may be longer than the second blank interval.

Each set including the second image data may comprise a third blank interval located between the second image data, and the interval of each set including the second image data may be equal to the interval of each set including the third image data.

Meanwhile, the charge sharing voltages may be obtained by connecting the data lines to each other.

The liquid crystal display may further comprise a common voltage generator applying a common voltage to a liquid crystal panel assembly in which the pixels, the gate lines and the data lines are provided , and the magnitude of the charge sharing voltages may be substantially the same as that of the common voltage.

BRIEF DESCRIPTION OF THE DRAWINGS

The exemplary embodiments of the present invention will be better understood from a reading of the ensuing description together with the drawing, in which.

DETAILED DESCRIPTION OF THE EMBODIMENTS

Figure 1:
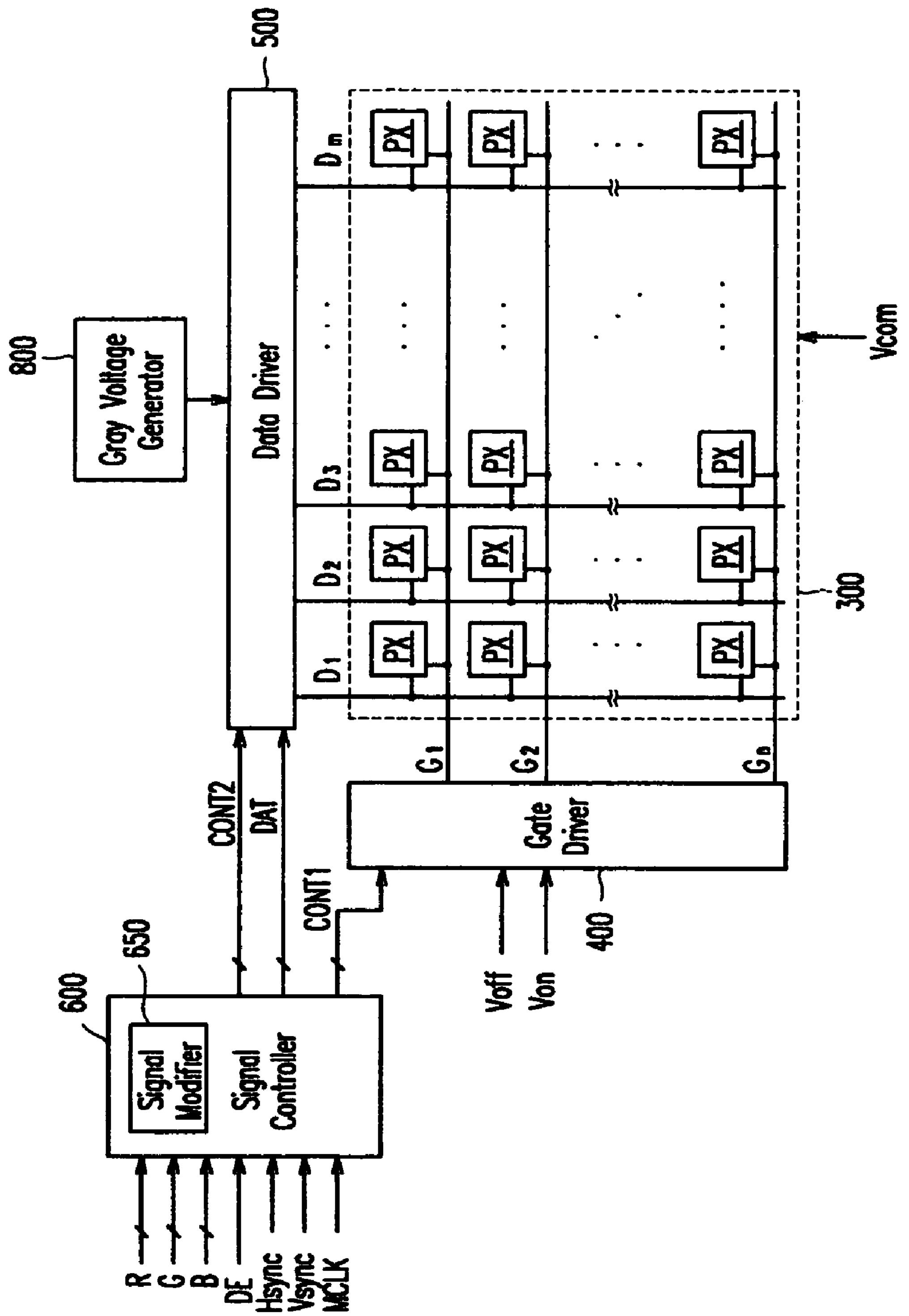
FIG. 1 is a block diagram of an LCD according to an embodiment of the present invention.
Figure 2:
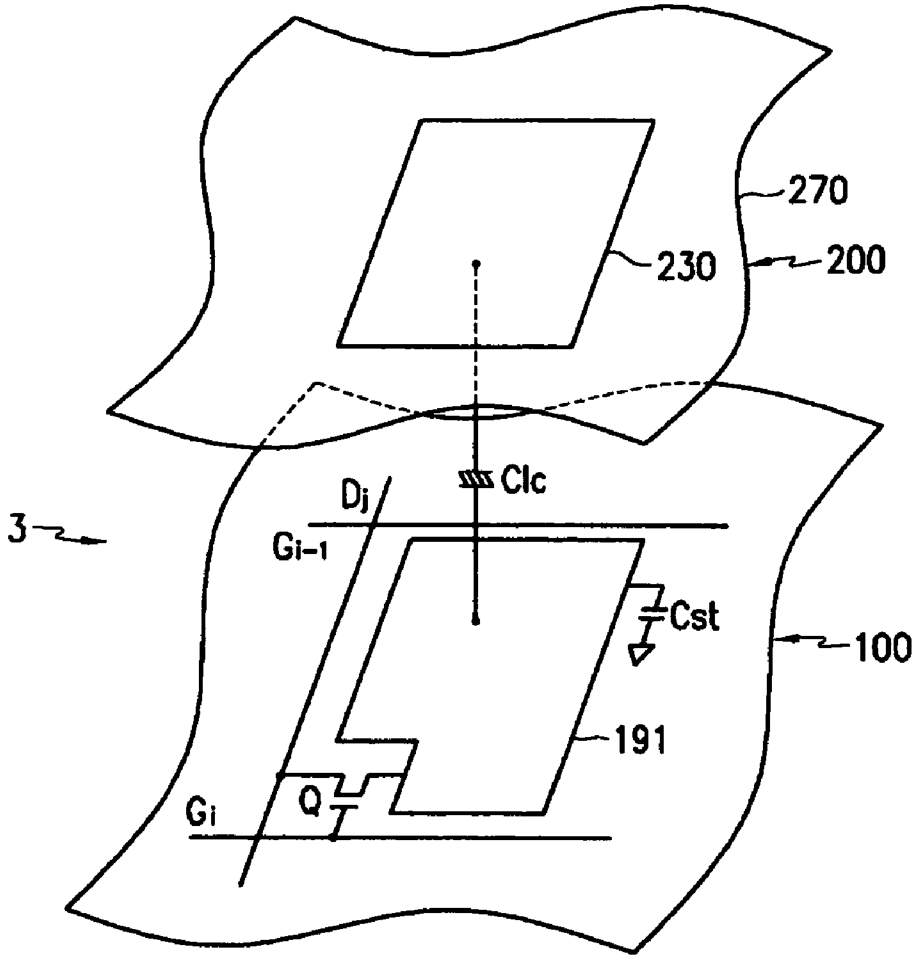
FIG. 2 is an equivalent circuit diagram of a pixel of an LCD according to an embodiment of the present invention.

FIG. 1 is a block diagram of an LCD according to an embodiment of the present invention, and FIG. 2 is an equivalent circuit diagram of a pixel of an LCD according to an embodiment of the present invention.

Referring to FIG. 1, an LCD according to an embodiment of the present invention includes an LC panel assembly 300, a gate driver 400 and a data driver 500 that are connected to the LC panel assembly 300, a gray voltage generator 800 connected to the data driver 500, and a signal controller 600 controlling the above elements.

The LC panel assembly 300 includes a plurality of signal lines $G_1$-$G_n$ and $D_1$-$D_m$, and a plurality of pixels PX connected thereto and arranged substantially in a matrix, as seen in the equivalent circuit diagram. The LC panel assembly 300 further includes lower and upper panels 100 and 200 which face each other and an LC layer 3 interposed therebetween, as can be seen in the structural view shown in FIG. 2.

The signal lines $G_1$-$G_n$ and $D_1$-$D_m$ include a plurality of gate lines $G_1$-$G_n$ for transmitting gate signals (also referred to as "scanning signals") and a plurality of data lines $D_1$-$D_m$ for transmitting data signals. The gate lines $G_1$-$G_n$ extend substantially in a row direction and substantially parallel to each other, and the data lines $D_1$-$D_m$ extend substantially in a column direction and substantially parallel to each other.

Each pixel PX, for example, the pixel PX connected to the i-th where (i=1, 2, . . . , n) gate line $G_i$ and the j-th where (j=1, 2, . . . , m) data line $D_j$, includes a switching element Q connected to the signal lines Gi and Dj, and an LC capacitor Clc and a storage capacitor Cst connected to the switching element Q. If unnecessary, the storage capacitor Cst may be omitted.

Switching element Q which may be a thin film transistor (TFT) is a three-terminal element provided on the lower panel 100 which has a control terminal connected to the gate line $G_i$, an input terminal connected to the data line $D_j$, an output terminal connected to an LC capacitor Clc, and a storage capacitor Cst.

The LC capacitor Clc includes pixel electrode 191 provided on the lower panel 100 and a common electrode 270 provided on the upper panel 200 as its two terminals with LC layer 3 disposed between the two electrodes as the dielectric. Pixel electrode 191 is connected to switching element Q. Common electrode 270 is formed on the entire surface of upper panel 200 and supplied with a common voltage Vcom. Unlike FIG. 2, the common electrode 270 may be provided on the lower panel 100 and at least one of the two electrodes 191 and 270 may have shapes of bars or stripes.

Storage capacitor Cst functions as an auxiliary capacitor to LC capacitor Clc and is formed by overlapping pixel electrode 191 with a separate signal line (not shown) which is provided on the lower panel 100 with an insulator disposed therebetween. The separate signal line is supplied with a predetermined voltage such as a common voltage Vcom. Alternatively, the storage capacitor Cst may be formed by overlapping the pixel electrode 191 with an upper previous gate line right above via an insulator.

To implement color display, each pixel PX may uniquely display one of the primary colors (spatial division) or each pixel PX may sequentially display the primary colors in turn (temporal division) such that the spatial or temporal sum of the primary colors are recognized as a desired color. An example of a set of the primary colors includes red, green, and blue colors. FIG. 2 shows an example of the spatial division in which each pixel PX includes a color filter 230 representing one of the primary colors in an area of upper panel 200 facing pixel electrode 191. Unlike FIG. 2, color filter 230 may be provided on or under the pixel electrode 191 on lower panel 100. One or more polarizers (not shown) for polarizing light are attached on the outer surface of LC panel assembly 300.

Referring to FIG. 1 again, gray voltage generator 800 generates two sets of a plurality of gray voltages (or reference gray voltages) related to the transmittance of the pixels PX. Gray voltages of one set have a positive value with respect to the common voltage Vcom, while gray voltages of the other set have a negative value with respect to the common voltage Vcom.

Gate driver 400 is connected to gate lines $G_1$-$G_n$ of LC panel assembly 300 and synthesizes a gate-on voltage Von and a gate-off voltage Voff to generate the gate signals.

Data driver 500 is connected to data lines $D_1$-$D_m$ and selects gray voltages supplied from gray voltage generator 800 and then applies the selected gray voltages to the data lines $D_1$-$D_m$ as data signals. However, if gray voltage generator 800 supplies only a predetermined number of reference gray voltages, data driver 500 divides the reference gray voltages to generate gray voltages for all grays, from which the data signals are selected. Signal controller 600 includes a signal modifier 650, and it controls gate driver 400, data driver 500, and gray voltage generator 800.

Each of the drivers 400, 500, 600, and 800 mentioned above may be directly mounted on the LC panel assembly 300 in the form of at least one integrated circuit (IC) chip. Alternatively, the drivers may be mounted on a flexible printed circuit film (not shown) in a tape carrier package (TCP) type which is attached to the LC panel assembly 300, or may be mounted on a separate printed circuit board (not shown). In other embodiments, each of the drivers 400, 500, 600, and 800 may be integrated into the LC panel assembly 300 along with the signal lines $G_1$-$G_n$ and $D_1$-$D_m$ and the switching elements Q. Also, the drivers 400, 500, 600, and 800 may be integrated into a single chip, and in this case, at least one thereof or at least one circuit element forming those may be located outside of the single chip.

Signal controller 600 is supplied with input image signals R, G, and B and input control signals controlling the display thereof from an external graphics controller (not shown). The input image signals R, G, and B include luminance information of each pixel PX which has a predetermined number of gray levels, for example, 1024(=$2^{10}$), 256(=$2^8$), or 64(=$2^6$) gray levels. The input control signals include, for example, a vertical synchronization signal Vsync, a horizontal synchronization signal Hsync, a main clock signal MCLK, and a data enable signal DE.

On the basis of the input control signals and the input image signals R, G and B, signal controller 600 processes the input image signals R, G, and B to be suitable for the operating conditions of LC panel assembly 300 and data driver 500 and generates gate control signals CONT1 and data control signals CONT2. Then, signal controller 600 transmits the gate control signals CONT1 to gate driver 400 and transmits the processed image signals DAT and the data control signals CONT2 to data driver 500. The output image signals DAT are digital signals having a predetermined number of values (or grays).

The gate control signals CONT1 include a scanning start signal STV for initiating the start of scanning, a gate clock signal CPV for controlling the output time of gate-on voltage Von, and at least one output enable signal OE for defining the duration of the gate-on voltage Von.

The data control signals CONT2 include a horizontal synchronization start signal STH for starting the transmission of output image signals DAT for a pixel row, a load signal TP for applying data signals to LC panel assembly 300, and a data clock signal HCLK. The data control signal CONT2 further includes a polarity signal POL for reversing the voltage polarity of the data signals with respect to the common voltage Vcom (hereinafter, "the voltage polarity of the data signals with respect to the common voltage Vcom" is referred to as "the polarity of the data signals").

Responding to the data control signals CONT2 from the signal controller 600, data driver 500 sequentially receives the digital image signals DAT for a row of pixels PX, selects gray voltages corresponding to the respective digital image signal DAT, converts the digital image signals DAT into analog data signals, and applies the analog data signals to the corresponding data lines $D_1$-$D_m$.

Gate driver 400 applies the gate-on voltage Von to the gate lines $G_1$-$G_n$ in response to the gate control signals CONT1, thereby turning on the switching elements Q connected to the gate lines $G_1$-$G_n$. Then, the data signals that are applied to the data lines $D_1$-$D_m$ are applied to the corresponding pixels PX through the turned-on switching elements Q.

The difference between the voltage of a data signal applied to a pixel PX and the common voltage Vcom appears as a charge voltage of the LC capacitor Clc, that is, a pixel voltage. The orientation of the LC molecules varies depending on the intensity of the pixel voltages and thus the polarization of light passing through the LC layer 3 varies. As a result, the transmittance of the light is varied by the polarizers attached to the LC panel assembly 300.

By repeating this procedure for each unit of the horizontal period (which is also denoted as "1H" and equal to one period of the horizontal synchronization signal Hsync and the data enable signal DE), all gate lines $G_1$-$G_n$ are sequentially supplied with the gate-on voltage Von, thereby applying the data signals to all pixels PX to display an image for a frame.

When the next frame starts after one frame is finished, the polarity signal POL applied to data driver 500 is controlled such that the polarity of the data signals applied to each pixel PX is reversed to be opposite to the polarity in the previous frame (which is referred to as "frame inversion"). Here, even in one frame, the polarities of data signals flowing in a data line may be changed (for example, row inversion or dot inversion) or the polarities of the data signals applied to a pixel row may be different from each other (for example, column inversion or dot inversion) in accordance with the characteristics of the polarity signal POL.

The structure and operation of signal modifier 650 and the data driver 500 according to an exemplary embodiment of the present invention will be described more in detail with reference to FIG. 3 to FIG. 6.

Figure 3:
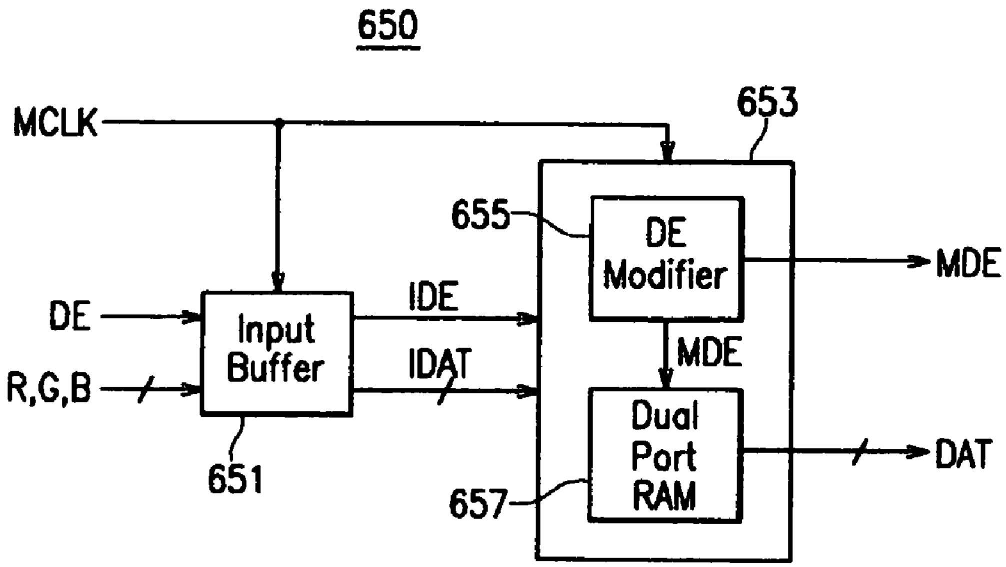
FIG. 3 is a block diagram illustrating a signal modifier of the LCD shown in FIG. 1.
Figure 4:
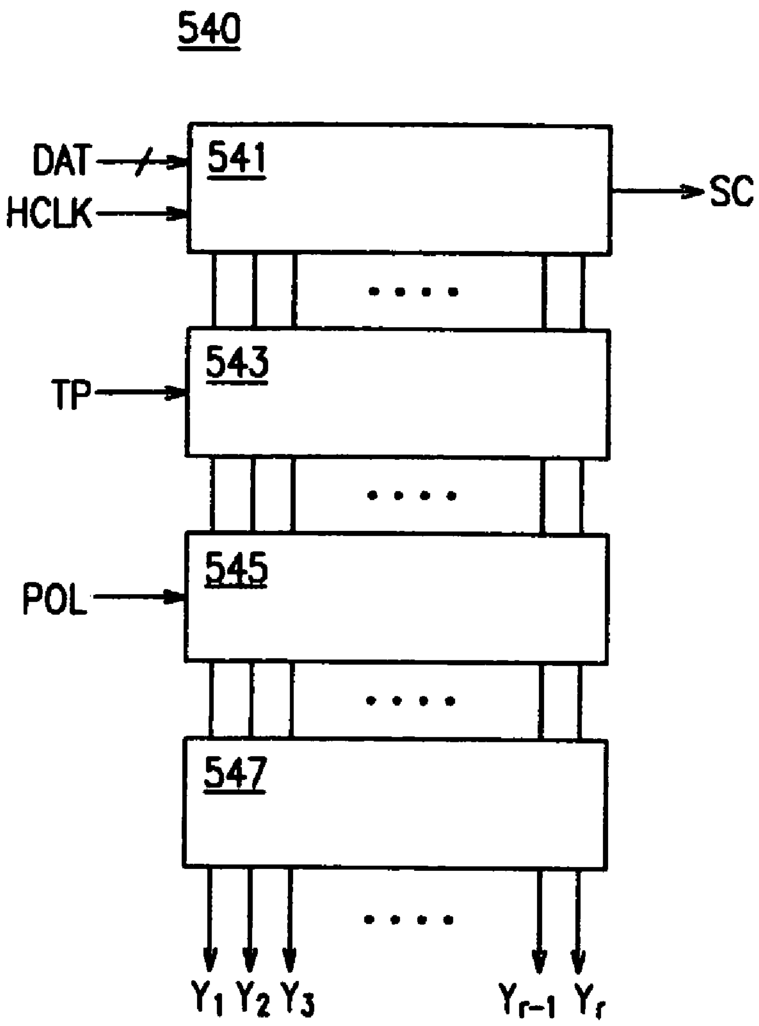
FIG. 4 is a block diagram illustrating an example of the data driver of the LCD shown in FIG. 1.
Figure 5:
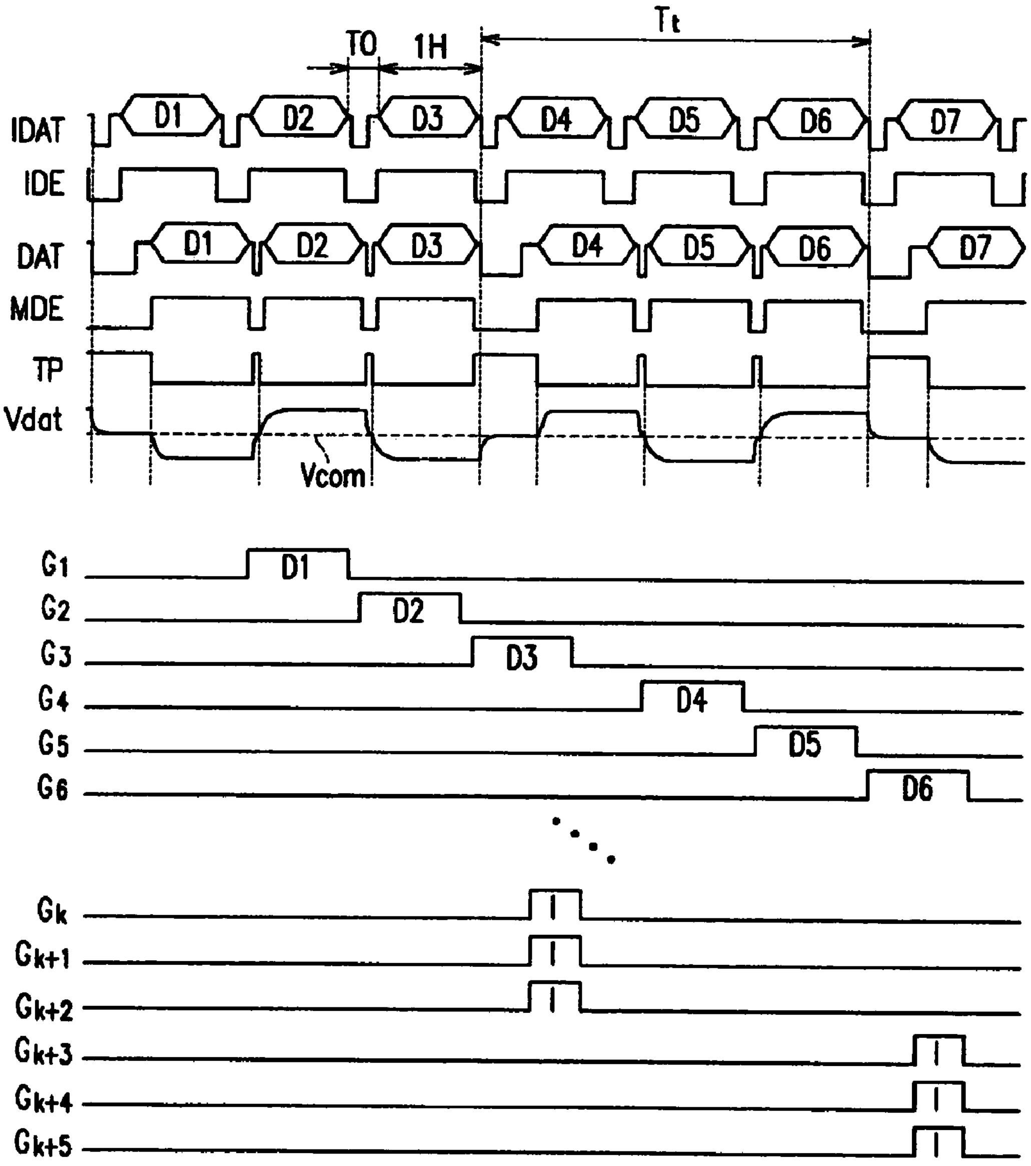
FIG. 5 is a timing diagram illustrating driving signals of an LCD according to an exemplary embodiment of the present invention.
Figure 6:
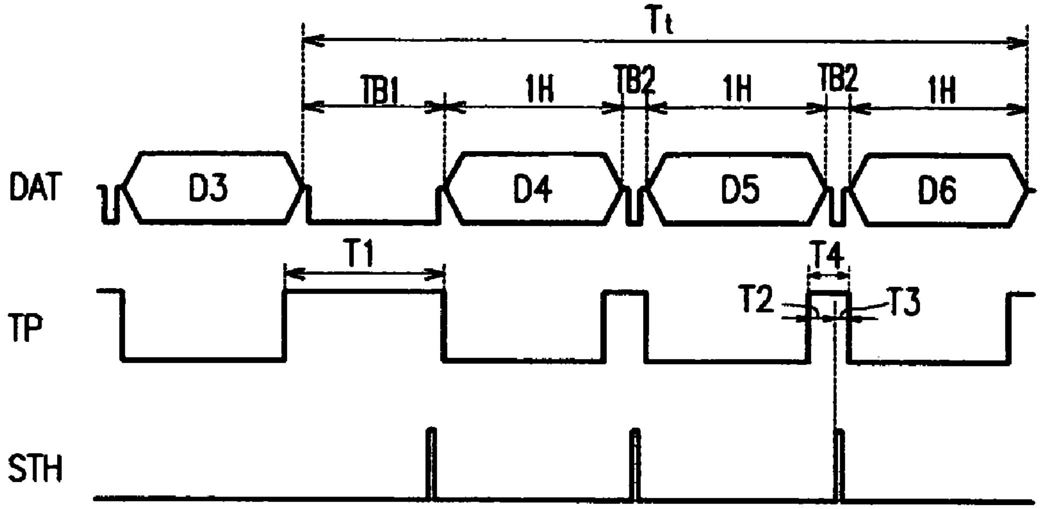
FIG. 6 is a timing diagram illustrating magnified control signals applied to a data driver among the driving signals shown in FIG. 5.

FIG. 3 is a block diagram of signal modifier 650, and FIG. 4 is a block diagram illustrating the data driver of FIG. 1. FIG. 5 is a timing diagram illustrating driving signals of an LCD, and FIG. 6 is a timing diagram illustrating magnified control signals applied to the data driver among the driving signals shown in FIG. 5.

Signal modifier 650 includes an input buffer 651 which receives a data enable signal DE and a data stream modifier 653. Both input buffer 651 and data stream modifier 653 receive clock signals MCLK. Data stream modifier 653 includes DE modifier 655 and a dual port RAM 657.

Data driver 500 includes at least one data driving IC 540 shown in FIG. 4, which includes a shift register 541, a latch 543, a digital-to-analog converter 545, and a buffer 547 that are sequentially connected to each other.

The LCD according to an exemplary embodiment of the present invention displays a regular image row by row sequentially from the first pixel row downward. After the regular image is displayed in M pixel rows, an impulse image is displayed simultaneously in N pixel rows from the k-th pixel row within a predetermined time. By repeating this process for a frame, the impulse image band having a width of N pixel rows progresses through the pixel rows. Hereinafter, this will be described in detail, in which M and N are equal to 3, as an example.

Signal modifier 650 processes the data enable signal DE and the input image signals R, G, and B and transmits a modified data enable signal MDE and image data DAT.

Input buffer 651 stores the data R, G, and B corresponding to a pixel row and the data enable signal DE, which are transmitted to data modifier 653 as signals IDE and IDAT, respectively. Input buffer 651 may be a line memory storing data for a row. DE modifier 655 receives the data enable signal IDE from input buffer 651 and dual port RAM 657 receives the image data IDAT.

DE modifier 655 analyzes the input data enable signal IDE for a pixel row, particularly the length of the blank interval TO (see FIG. 5), and transmits a modified data enable signal MDE to dual port RAM 657 and to data driving IC 540, FIG. 4, respectively.

Dual port RAM 657 is a RAM that performs writing and reading simultaneously with the data enable signal DE. Writing is performed in accordance with the input data enable signal IDE, and reading is performed in accordance with the modified data enable signal MDE.

Consequently, a portion of the image data DAT is delayed compared to the input image data IDAT according to the modified data enable signal MDE. For example, as shown in FIG. 5, three image data D4, D5 and D6 are output in the same time interval Tt as image data D1, D2, and D3 after a blank interval TB1. The duration of interval TB1 in data stream DAT is accounted for by shortening the blanking intervals T0 in the IDAT stream of data to TB2. Note that the image data D6 is not delayed since it is accommodated in the same allotted time Tt in data stream DAT as it would have been in data stream IDAT. That is, in case of a delay of data for a predetermined number of pixel rows as a packet, the last data of the packet is not delayed, but data prior to the last data is delayed, thereby generating the blank interval TB1.

As described above, the entire time Tt, which is the sum of image data D4, D5 and D6 for three pixel rows and blank intervals, is the same in both of the input data enable signal IDE and the output data enable signal MDE, and accordingly, the length of a blank interval TB1 can be equal to the difference of 3T0 and 2TB2. In this way, the output image data DAT are input to the data driving IC 540.

When horizontal synchronization start signal STH is active, shift register 541 of data driving IC 540 sequentially shifts the input image data DAT to latch 543 in response to the data clock signal HCLK. If data driver 500 includes a plurality of data driving ICs 540, after shift register 541 shifts all of the image data DAT it transmits a shift clock signal SC to the shift register of the adjacent data driving IC.

Latch 543 includes first and second latches (not shown). The first latch sequentially receives the image data DAT from shift register 541 and stores the input image data DAT. The second latch simultaneously receives and stores the image data DAT from the first latch at the rising edge of the load signal TP and then transmits them to the digital-to-analog converter 545 at the falling edge of the load signal TP.

Here, a high interval T4 of the load signal TP includes an interval T2 which is equal to a blank interval TB2 and an interval T3 between the rising edge of the horizontal synchronization start signal STH and the falling edge of the load signal TP. Here, it is preferable to minimize the interval T4 as much as the specification of products permits. Since an LCD, unlike a CRT, doesn't use electron guns, it doesn't matter even if the blank interval TB2 and the high interval T4 of the load signal TP described above are minimized. However, since an image standard is based on a CRT, only the minimum of specification in this regard should be satisfactory.

Digital-to-analog converter 545 converts the digital image data DAT from latch 543 into analog data voltages to be transmitted to buffer 547. The data voltages have positive or negative values with respect to the common voltage Vcom according to the polarity signal POL.

Buffer 547 transmits the data voltages from digital-to-analog converter 545 to the output terminals $Y_1$-$Y_r$. The polarities of the data voltages outputted through neighboring output terminals $Y_1$-$Y_r$ are different from each other. The output terminals $Y_1$-$Y_r$ are connected to the corresponding data line $D_1$-$D_m$.

Here, the image data DAT are output to the data lines $D_1$-$D_m$ after passing through the second latch at the falling edge of load signal TP, digital-analog converter 545, and buffer 547 as illustrated. The image data D0 may be either an image data for the last pixel row of the previous frame or an arbitrary voltage.

Meanwhile, the data driving IC 540 internally connects all of the output terminals $Y_1$-$Y_r$ when the load signal TP changes into a high level during blank intervals TB1 and TB2. When all of the output terminals $Y_1$-$Y_r$ are connected, data line voltages Vdat having positive polarity and negative polarity applied to the corresponding data lines are connected to each other, so that a charge sharing voltage having the middle value between the data line voltages of positive polarity and negative polarity, approximately a level of the common voltage Vcom, is applied to all of the output terminals $Y_1$-$Y_r$ as shown in FIG. 5. In this state, when the load signal TP changes into a low level again, the image data DAT stored in the latch 543 are converted into data voltages to be transmitted to the output terminals $Y_1$-$Y_r$.

Particularly, the charge sharing voltage generated for a blank interval TB3 is used as an impulse voltage, which is applied to a plurality of pixel rows for a blank interval TB1 after application of regular image data DAT thereto. In other words, for a frame, while sequentially generating gate-on voltages Von so that regular image data DAT are applied to pixels PX, the gate driver 400 simultaneously generates a plurality of gate-on voltages Von so that the impulse voltage is applied to the pixels PX, and this will be described more in detail with reference to FIG. 7 as well as FIG. 5 and FIG. 6 described above.

Figure 7:
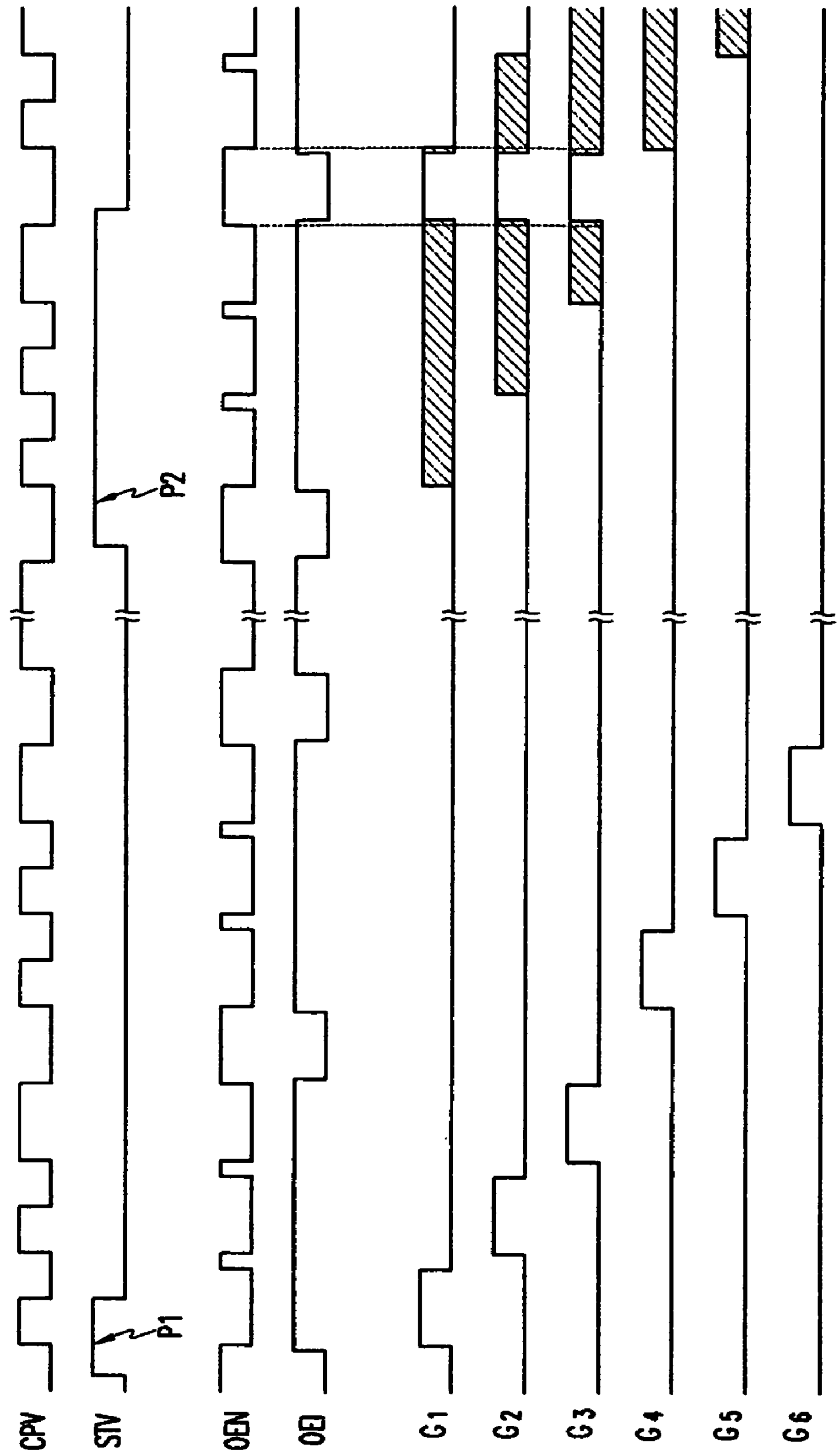
FIG. 7 is a timing diagram illustrating gate signals shown in FIG. 5 and control signals inputted to a gate driver.

FIG. 7 is a timing diagram of a gate driver 400 according to an exemplary embodiment of the present invention.

FIG. 7 illustrates the gate control signals CONT described above, that is, a scanning start signal STV for instructing to start scanning, at least one gate clock signal CPV for controlling the output time of the gate-on voltage Von, at least one output enable signal OEN and OEI for defining the duration time of the gate-on voltage Von, and the first through the sixth gate lines $G_1$-$G_6$ among the gate lines $G_1$-$G_n$ in which the protrusion of each part represents the gate-on voltage Von.

Two pulses having a period of 1 H and one pulse having a period of 2 H are repeated in the gate clock signal CPV, and the gate-on voltages Von are generated in accordance with the gate clock signal CPV.

The scanning start signal STV includes two signals, regular image data signal P1 and an impulse data signal P2, which are inputted to the gate driver 400. Particularly, the impulse data signal P2 has a sufficient length so that the gate-on voltages Von can be simultaneously outputted to three gate lines. For example, the length of the high interval of the impulse data signal P2 is 4 H in FIG. 7, and when a delay of image data for 4 pixel rows as a packet, the length thereof may be 5 H.

The output enable signal OEN for regular image data and the output enable signal OEI for an impulse voltage define the duration time of a gate-on voltage Von for regular image data and a gate-on voltage Von for an impulse voltage, respectively. Here, as shown in FIG. 7, when the two signals OEN and OEI are in a high state, the two gate-on voltages Von remain in a low state, respectively, and, alternatively, the two gate-on voltages Von remain a high state when the two signals OEN and OEI are in a low state.

Accordingly, even if the gate driver 400 outputs a gate-on voltage Von having a high interval which has a width of 4 H, a gate-on voltage Von having a width reduced as much as the width of the output enable signal OEI is outputted due to the output enable signal OEI. When the generated gate-on voltage Von for an impulse voltage is applied to the gate lines $G_k$-$G_{k+2}$ shown in FIG. 5, the impulse voltage I is applied to the corresponding pixel Q. Likewise, in FIG. 7, it is shown that each of the gate-on voltages Von for regular image data applied to the third and the sixth gate lines $G_3$ and $G_6$ is also outputted having a high interval with a limited width by the output enable signal OEN.

Therefore, when the gate driver 400 simultaneously applies gate-on voltages Von to the k-th gate line $G_k$ through the (k+2)-th gate line $G_{k+2}$, thereby turning on the switching elements Q connected thereto, the charge sharing voltages are applied to corresponding pixels PX to display impulse images. These impulse images appear to be a black band when the LCD is in a normally black mode.

In summary, the signal controller 600 generates a sufficient blank interval TB1 by delaying the rest of the image data except the last image data of a packet, which packet consists of image data for a predetermined number of pixel rows, and the data driver 500 applies charge sharing voltages as impulse voltages to the predetermined number of pixel rows for the blank interval TB1, thereby displaying impulse images.

In this way, since impulse images are displayed only by delaying image data DAT within the same time Tt and separate black image data are not transmitted, the data transmission frequency is not increased. Consequently, a high resolution display can be realized in addition to minimizing EMI increase. Also, since only one clock signal MCLK exists in the signal controller 600, it is easy to synchronize various signals.

Although preferred embodiments of the present invention have been described in detail, numerous modifications will be apparent to those skilled in the art, and may be made without, however, departing from the spirit and scope of the present invention.

What is claimed is:

1. A liquid crystal display comprising:

a plurality of pixels arranged in a matrix;

data lines and gate lines connected to the pixels;

a signal controller processing first image data and a plurality of control signals from an external device and transmitting the processed first image data and control signals; and a data driver connected to the signal controller, wherein the signal controller divides the first image data into and sequentially processes a plurality of sets respectively including the first image data for at least two pixel rows, while delaying the remaining image data excluding the last image data among the first image data of each of the sets, and the data driver applies a charge sharing voltage as an impulse voltage to a the predetermined number of pixel rows during the delayed time, thereby displaying impulse images.

2. The liquid crystal display of claim 1, wherein the signal controller comprises:

a first memory receiving the first image data and a first signal among the plurality of control signals and transmitting second image data and a second signal every pixel row;

a modifier receiving the second signal and transmitting a third signal; and a second memory receiving the second image data, the second signal, and the third signal.

3. The liquid crystal display of claim 2, wherein the second memory receives the second image data in response to the second signal and simultaneously transmits a plurality of sets of third image data in response to the third signal.

4. The liquid crystal display of claim 3, further comprising a gate driver generating first and second gate-on voltages and applying the first and the second gate-on voltages to the gate lines.

5. The liquid crystal display of claim 4, wherein the gate driver sequentially applies the first gate-on voltage to the gate lines and then simultaneously applies the second gate-on voltage to a plurality of gate lines excluding the gate lines during the delayed time.

6. The liquid crystal display of claim 5, wherein the delayed time is referred to as a first blank interval, and the third image data set further comprises a second blank interval located between the first blank interval and the third image data.

7. The liquid crystal display of claim 6, wherein the first blank interval is longer than the second blank interval.

8. The liquid crystal display of claim 7, wherein each set including the second image data comprises a third blank interval located between the second image data, and an entire time of each set including the second image data is equal to an entire time of each set including the third image data.

9. The liquid crystal display of claim 1, wherein the charge sharing voltages are obtained by connecting the data lines to each other.

10. The liquid crystal display of claim 9, further comprising a common voltage generator applying a common voltage to a liquid crystal panel assembly in which the pixels, the gate lines and the data lines are provided.

11. The liquid crystal display of claim 10, wherein a magnitude of the charge sharing voltages are substantially the same as that of the common voltage.

12. A method of driving a liquid crystal display comprising a plurality of pixels arranged in a matrix; data lines and gate lines connected to the pixels; a signal controller receiving and processing first image data and a plurality of control signals from an exterior and transmitting the processed first image data and control signals; and a data driver connected to the signal controller, the method comprising:

a first step of dividing the first image data into and sequentially processing a plurality of sets respectively including the first image data for at least two pixel rows, while delaying the remaining image data excluding the last image data among the first image data of each of the sets; and a second step of applying a charge sharing voltage as an impulse voltage to a predetermined number of pixel rows during the delayed time, thereby displaying impulse images.

13. The method of driving a liquid crystal display of claim 12, wherein the first step comprises:

receiving the first image data and a first signal among the plurality of control signals and generating second image data and a second signal every pixel row;

receiving the second signal and generating a third signal; and receiving the second image data, the second signal and the third signal.

14. The method of driving a liquid crystal display of claim 13, wherein the first step further comprises generating a plurality of sets of third image data in response to the third signal.

15. The method of driving a liquid crystal display of claim 14, further comprising a third step of generating first and second gate-on voltages and applying the first and the second gate-on voltages to the gate lines.

16. The method of driving a liquid crystal display of claim 15, wherein the third step comprises sequentially applying the first gate-on voltage to the gate lines and then simultaneously applying the second gate-on voltage to a plurality of gate lines excluding the gate lines during the delayed time.

17. The method of driving a liquid crystal display of claim 16, wherein the delayed time is referred to as a first blank interval, and the third image data set further comprises a second blank interval located between the first blank interval and the third image data.

18. The method of driving a liquid crystal display of claim 17, wherein the first blank interval is longer than the second blank interval.

19. The method of driving a liquid crystal display of claim 18, wherein each set including the second image data comprises a third blank interval located between the second image data, and an entire time of each set including the second image data is equal to an entire time of each set including the third image data.

20. The method of driving a liquid crystal display of claim 12, wherein the charge sharing voltages are obtained by connecting the data lines to each other.

21. The method of driving a liquid crystal display of claim 20, wherein the liquid crystal display further comprises a common voltage generator applying a common voltage to a liquid crystal panel assembly in which the pixels, the gate lines and the data lines are provided.

22. The method of driving a liquid crystal display of claim 21, wherein the magnitude of the charge sharing voltages are substantially the same as that of the common voltage.

* * * * *